United States Patent [19]
Byrne et al.

[11] Patent Number: 5,157,517
[45] Date of Patent: Oct. 20, 1992

[54] PARALLEL INTERPOLATOR FOR HIGH SPEED DIGITAL IMAGE ENLARGEMENT

[75] Inventors: Timothy J. Byrne; Mark A. Momcilovich, both of Newark, Del.

[73] Assignee: E. I. Du Pont De Nemours and Company, Wilmington, Del.

[21] Appl. No.: 692,655

[22] Filed: Apr. 29, 1991

[51] Int. Cl.⁵ .............................................. H04N 1/46
[52] U.S. Cl. ...................................... 358/451; 358/78
[58] Field of Search ............... 358/140, 180, 133, 78, 358/451, 452, 448, 77, 78

[56]  References Cited
U.S. PATENT DOCUMENTS

| 3,573,789 | 4/1971 | Sharp et al. | 340/324 |
| 4,468,693 | 8/1984 | Fujita et al. | 358/78 |
| 4,719,509 | 1/1988 | Sakamoto | 358/112 |
| 4,734,759 | 3/1988 | Kobori et al. | 358/75 |
| 4,823,201 | 4/1989 | Simon et al. | 358/133 |
| 4,837,722 | 6/1989 | Sara | 364/723 |
| 4,853,794 | 8/1989 | Fukumoto et al. | 358/447 |
| 4,872,064 | 10/1989 | Tutt et al. | 358/77 |

FOREIGN PATENT DOCUMENTS 0336776 11/1989 European Pat. Off. ................. 1/393

Primary Examiner—Stephen Brinich
Attorney, Agent, or Firm—J. E. Griffiths

[57] ABSTRACT

Generation of new pixels and pixel values for a modified format image is achieved by employing parallel signal pipelines in a way that allows for highly efficient insertion of suitably modified interpolatd pixels adjacent to the original pixels.

18 Claims, 3 Drawing Sheets

FIG.1

| D11 | D21 | D31 | D41 |
|-----|-----|-----|-----|
| D12 | D22 | D32 | D42 |
| D13 | D23 | D33 | D43 |
| D14 | D24 | D34 | D44 |

FIG.2

| D11 | | D21 | | D31 | | D41 |
|-----|---|-----|---|-----|---|-----|
| | | | | | | |
| D12 | | D22 (N1) | N2 | D32 | | D42 |
| | | N3 | N4 | | | |
| D13 | | D23 | | D33 | | D43 |
| | | | | | | |
| D14 | | D24 | | D34 | | D44 |

PARALLEL INTERPOLATOR FOR HIGH SPEED DIGITAL IMAGE ENLARGEMENT

BACKGROUND OF THE INVENTION

1. Field of the Invention

This invention relates to digital image processing and more particularly to apparatus for rapidly performing data interpolation required for image magnification.

2. Description of the Prior Art

A digitally stored image comprises a plurality of numerical values each representing an image characteristic, typically an optical density value, for a small, discrete portion of the image. These values are known in the art as PIXEL values, the name representing a short hand form of the term "Picture Element". The relative location of each PIXEL in the complete image is also known. A captured and digitized image is stored in a memory in the form of a finite number of picture values representing image densities for each PIXEL.

In reconstructing the image for display, the stored PIXEL values are recovered and used to recreate each original picture element in the exact location in the image, with the same optical density as in the original.

So long as there is a one to one relationship between the number of acquired original picture elements and the required output picture elements there are of course no problems. When one wishes to magnify an acquired image during display, it becomes immediately apparent that since the supply of original pixel data is fixed, there will be gaps in the displayed information, which must be filled in some manner in order to produce an acceptable display.

It has been known to use the original pixel data to interpolate additional pixel values filling in the gaps in the original data generated because of the image magnification. Mathematical techniques to do the interpolation are well known.

A commonly used approach for data interpolation, relies on defining in mathematical terms a three dimensional curve using existing pixel data and from that curve calculating intermediate pixel values. Existing pixel values are obtained from a defined area surrounding the area to be filled in, and these values are used to predict additional pixel values. The number of the new pixels depends on the magnification ratio. For a magnification of 2 times, for instance, four values have to be generated for each original pixel value. The new values are calculated using a number of arithmetic operations on the available pixel data, which involve selecting a predetermined number of coefficients, multiplying a selected number of original pixel data by the selected coefficients, and adding the results to produce new pixel values.

The process of selecting the proper coefficients, obtaining the original data, multiplying and adding the result to produce new values is time consuming, and particularly so if implemented in software. A substantial speed advantage may be gained by developing hardware to do the mathematical processing. Some such hardware is disclosed in U.S. Pat. Nos. 4,468,693 and 4,837,722. While both of the above references teach circuitry that achieves rapid new pixel generation, when dealing with large image magnification ratios and particularly in situations where there is need to use multiple coefficients resulting in numerous arithmetic operations, especially when real, or quasireal, time displays are desired, increased speed is still needed.

SUMMARY OF THE INVENTION

It is an object of the present invention to provide a high speed processor which interpolates digital data to generate new pixel values faster than heretofore achieved. This is achieved through an apparatus for calculating new pixel values by interpolation from original pixel values for images comprised of a plurality of pixels serially arrayed along a plurality of parallel lines, comprising:

primary timing signal means for generating an input timing signal having an input frequency;

output timing signal means for generating an output timing signal having an output frequency which is an integral multiple of the input frequency;

a plurality of parallel connected signal pipelines, each having a plurality of serially connected cells for receiving, holding, and transmitting, on command from the primary timing signal, an electrical signal indicative of a pixel value;

means associated with the pipelines, for serially supplying each of said pipelines in parallel with original pixel values from each of the parallel image lines and for moving all said supplied original pixel values simultaneously from cell to cell along each pipeline at a time interval controlled by the primary timing means;

calculating means associated with each of the cells including:

(1) selecting means controlled by said output timing signal means, for selecting, during a time interval controlled by the primary timing means, a number of subsets of coefficients;

(2) multiplying means for multiplying each time the original pixel values in the pipelines by one of said selected coefficient subsets; and (3) summing means for summing the output of said multiplying means for providing new pixel values.

The number of coefficient subsets will typically equal the square power of the magnification ratio M.

There may also be receiving means associated with said summing means, for receiving said new pixel value, such as buffer storage means.

It is also an object of the present invention to provide a method for calculating new pixel values by interpolation from original pixel values for images comprised of a plurality of pixels serially arrayed along a plurality of parallel lines, comprising the steps of:

generating a primary timing signal having a first frequency;

generating a secondary timing signal having a second frequency which is an integral multiple of the first frequency;

serially supplying original pixel values from each of the parallel image lines simultaneously to a plurality of parallel connected signal pipelines, each having a plurality of serially connected cells for receiving, holding, and transmitting, on command from the primary timing signal, an electrical signal indicative of a pixel value;

moving all said supplied original pixel values simultaneously from cell to cell along each pipeline at a time interval controlled by the primary timing means; and calculating new pixel values by:

(1) selecting at a rate controlled by said second timing signal during a time interval controlled by said first timing means, a number of subsets of coefficients;

(2) multiplying each time the original pixel values in the pipelines by one of said selected coefficient subsets; and (3) summing the output of said multiplying means.

BRIEF DESCRIPTION OF THE DRAWINGS

FIG. 1 shows an arrangement of a number of Pixels representing a portion of an original image.

FIG. 2 shows the gap in pixel information resulting from a two-fold magnification of the image portion depicted in FIG. 1.

DETAILED DESCRIPTION OF THE INVENTION

Figure 3:
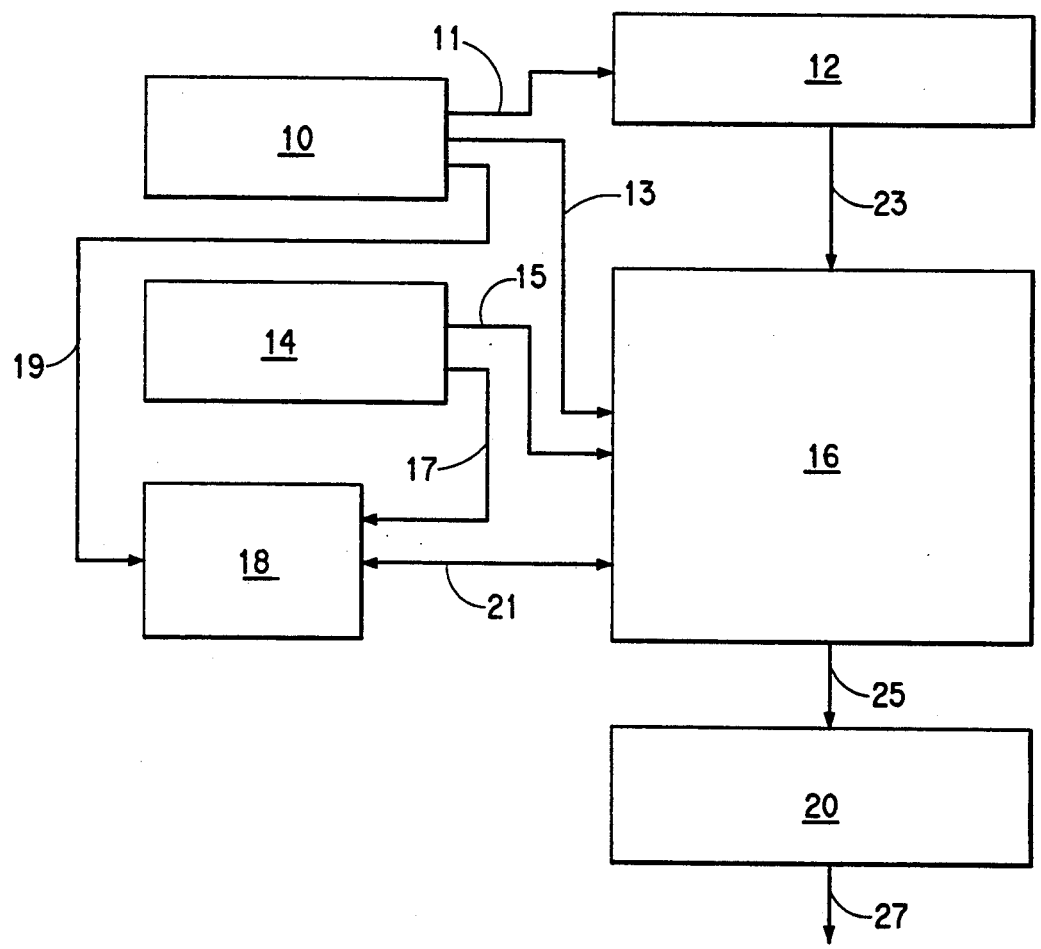
FIG. 3 is a block diagram of hardware implementing the present invention.

FIGS. 1 and 2 illustrate the problem briefly discussed in the prior art section of this specification. FIG. 1 shows a small portion of an original image represented by 16 picture elements arranged in a 4×4 array. The original image comprises of course a large number of such elements, and we have only isolated a tiny portion for illustrative purposes.

Each picture element is identified by column and row designation as to its relative position in the image (D11 ... D44). Associated with each pixel there is a numerical value which corresponds to a digital representation of the optical density of the original image within each of the picture elements. This value may be preserved in a temporary or permanent memory where from it can be accessed and used to reproduce the original picture optical density. In an 8 bit digital system this value may be a number between 0 and 255. Also associated with each number is an address which permits locating the memory contents for a corresponding image location. The technology for capturing storing and retrieving an image in digital format is well known and needs not be further discussed herein.

In reproducing this image portion without magnification, the display device will typically be driven so that for each of the stored pixel values there is reproduced on the display a corresponding displayed picture element with this value. Thus in the output, for each D11 ... D44 there is a D'11 ... D'44. Each of the output pixels is arrayed adjacent to each other exactly as in the original image.

FIG. 2 shows what happens when the original image is displayed in double the original size using the same display device as before. Since the image is now twice as big, each original picture element covers an area in the output display that is four times as large. Thus D11 now should be extended to cover four adjacent pixels, D12 four more and so on, so that the original 4×4 pixel area will extend over 8×8 pixels.

However, data initially is only available for D11 ... D44 and if evenly spread, would cover only 16 pixels as shown in FIG. 2. Before we display the enlarged image we need to generate new pixel values for the blank pixels. Typically, if we set the magnification factor as M, every picture element in the original image will be replaced by $M^2$ output pixels. Using any one of the available interpolating techniques for developing new pixel values, each new pixel value is calculated by multiplying original pixel data by weighting factors and summing the results of the multiplication. Usually a neighborhood of 4×4 original pixels will be used. If the pixels are represented by "D" as shown in FIGS. 1 and 2, there is a different set of weighing factors by which each of the original pixel values must be multiplied four times to generate the replacement value N1, and the new values N2, N3, and N4, for each original pixel D. We can represent these weighing factors as a coefficient matrix $C_k$ where:

$$C_k = \begin{matrix} C_{11} & C_{21} & C_{31} & C_{41} \\ C_{12} & C_{22} & C_{32} & C_{42} \\ C_{13} & C_{23} & C_{33} & C_{43} \\ C_{14} & C_{24} & C_{34} & C_{44} \end{matrix}$$

and where $K = 1, 2, \ldots M^2$ (Magnification factor).

The derivation of the weighing factors which depends on the interpolation process selected, i.e. linear, bilinear, cubic etc. is beyond the scope of this invention. Co-pending application Ser. No. 07/636,647, filed Dec. 31, 1990 and assigned to the Assignee of the present application teaches how such calculations may be done.

Using the above notation, the new output pixels $N_k$ corresponding to D are given by the following formula:

$$N_k = \Sigma_j \Sigma_i D_{ij} C_{ijk} \qquad (1)$$

for j=1 to 4, for i=1 to 4, and for all k.

The following numerical example illustrates an interpolation calculation for a 2× magnification limited to the calculation of the pixels designated as N1, N2, N3, and N4 shown in FIG. 2. Calculation of each of the remaining values within the designated pixel matrix is done in a similar manner. For purposes of this example the following specific values are given to the pixels D in FIG. 1:

$$D = \begin{matrix} 150 & 170 & 200 & 200 \\ 145 & 161 & 193 & 201 \\ 147 & 165 & 197 & 203 \\ 153 & 172 & 199 & 202 \end{matrix}$$

The following is a set of coefficients $C_k$ developed for the case of cubic convolution interpolation. In this example, M=2 and K=1, 2, 3 & 4. The coefficients were developed for the region D shown above, in the vicinity of D22.

| | | | | |
|---|---|---|---|---|
| $C_1 =$ | 0 | 0 | 0 | 0 |
| | 0 | 1 | 0 | 0 |
| | 0 | 0 | 0 | 0 |
| | 0 | 0 | 0 | 0 |
| $C_2 =$ | 0 | 0 | 0 | 0 |
| | −0.0750 | 0.5750 | 0.5750 | −0.0750 |
| | 0 | 0 | 0 | 0 |
| | 0 | 0 | 0 | 0 |
| $C_3 =$ | 0 | −0.0750 | 0 | 0 |
| | 0 | 0.5750 | 0 | 0 |
| | 0 | 0.5750 | 0 | 0 |
| | 0 | −0.0750 | 0 | 0 |
| $C_4 =$ | 0.0056 | −0.0431 | −0.0431 | 0.0056 |
| | −0.0431 | 0.3306 | 0.3306 | −0.0431 |
| | −0.0431 | 0.3306 | 0.3306 | −0.0431 |
| | 0.0056 | −0.0431 | −0.0431 | −0.0056 |

Each of $C_1$, $C_2$, $C_3$, and $C_4$ is a subset of the set of coefficients $C_k$. Applying Equation (1) to D22 yields the following output pixel values:

$N_1 =$     $(1)(161) = 161$ $N_2 =$     $(-0.075)(145) + (0.5750)(161) + (0.5750)(193) + (-0.075)(201) = 178$ $N_3 =$     $(-0.075)(170) + (0.5750)(161) + (0.5750)(165) + (-0.075)(172) = 162$ $N_4 =$     $(0.0056)(150) + (-0.0431)(170) + (-0.0431)(200) + (0.0056)(205) + (-0.0431)(145) + (0.3306)(161) + (0.3306)(193) + (-0.0431)(201) + (-0.0431)(147) + (0.3306)(165) + (0.3306)(197) + (-0.0431)(203) + (0.0056)(153) + (-0.0431)(172) + (-0.0431)(199) + (0.0056)(202) = 179$

---

The new values $N_1$, $N_2$, $N_3$ and $N_4$ will be placed as shown in FIG. 2. The calculation process will be then be repeated for the next pixel, i.e., D23 to generate another set of four new pixels, and so on.

FIG. 3 shows hardware to rapidly perform the aforementioned discussed operations. This hardware comprises a primary clock 10 having a first (input) frequency, which controls over line 11 the supply of image pixel data from a memory 12 containing the original picture data. Pixel data from memory 12 are supplied over line 23 to an interpolator module 16.

The primary clock 10 also provides input timing signals to the interpolator module 16, to be further discussed in detail hereinbelow, and to a coefficient source module 18, over lines 13 and 19 respectively. The coefficient source 18 may be a memory containing precalculated sets of coefficients accessible in the form of a look-up-table or tables containing fixed values, or it may include calculating elements able to calculate a set of coefficients based on input from the original pixel data in the interpolator. The latter is particularly useful where the interpolation is adaptive, i.e. the coefficients change with the image as the image nature varies. The coefficients are supplied to the interpolator module over line 21.

Figure 5:
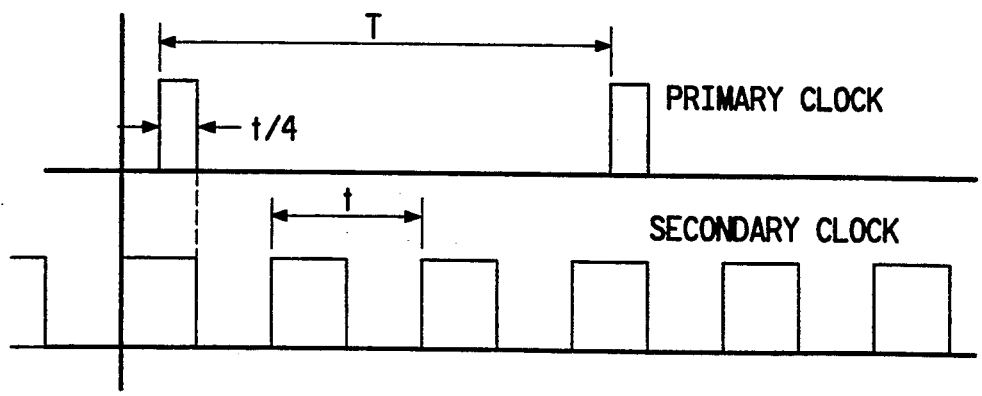
FIG. 5 shows the relationship between the primary and secondary clock timing output pulses.

In accordance with the present invention, a secondary clock 14 having a second (output) frequency, is used in addition to the primary clock 10. This secondary clock provides an output timing signal whose period is a fraction of the primary clock period equal to the inverse of the desired image magnification "M". FIG. 5 shows the relationship of the timing pulses produced by the two clocks for the M=4 case. In the preferred embodiment the period "t" of the secondary clock is set and kept constant, and the period "T" of the primary clock is varied to produce the required frequency relationship, as a matter of convenience. It is further preferred that the falling edge of the output pulses of the primary clock coincides with the falling edge of an output pulse of the secondary clock as shown in FIG. 5. Also in the preferred embodiment the width of the primary clock pulse is set at ¼ the period t of the secondary clock.

The output timing signal is supplied to the interpolator module 16 over line 15. When an interpolation method using adaptive coefficients is practiced the output timing signal is further supplied to the coefficient source module 18 to control the rate of extraction of coefficient sets which are subsequently supplied to the interpolation module over line 21. In the preferred embodiment, the coefficient source module 18 is omitted, and precalculated coefficients are used which are preloaded in the interpolator module 16 memory modules which are discussed later on in this specification.

The output of the interpolator 16 is preferably directed over line 25 to a buffer storage 20 for further processing, which may include display.

Figure 4:
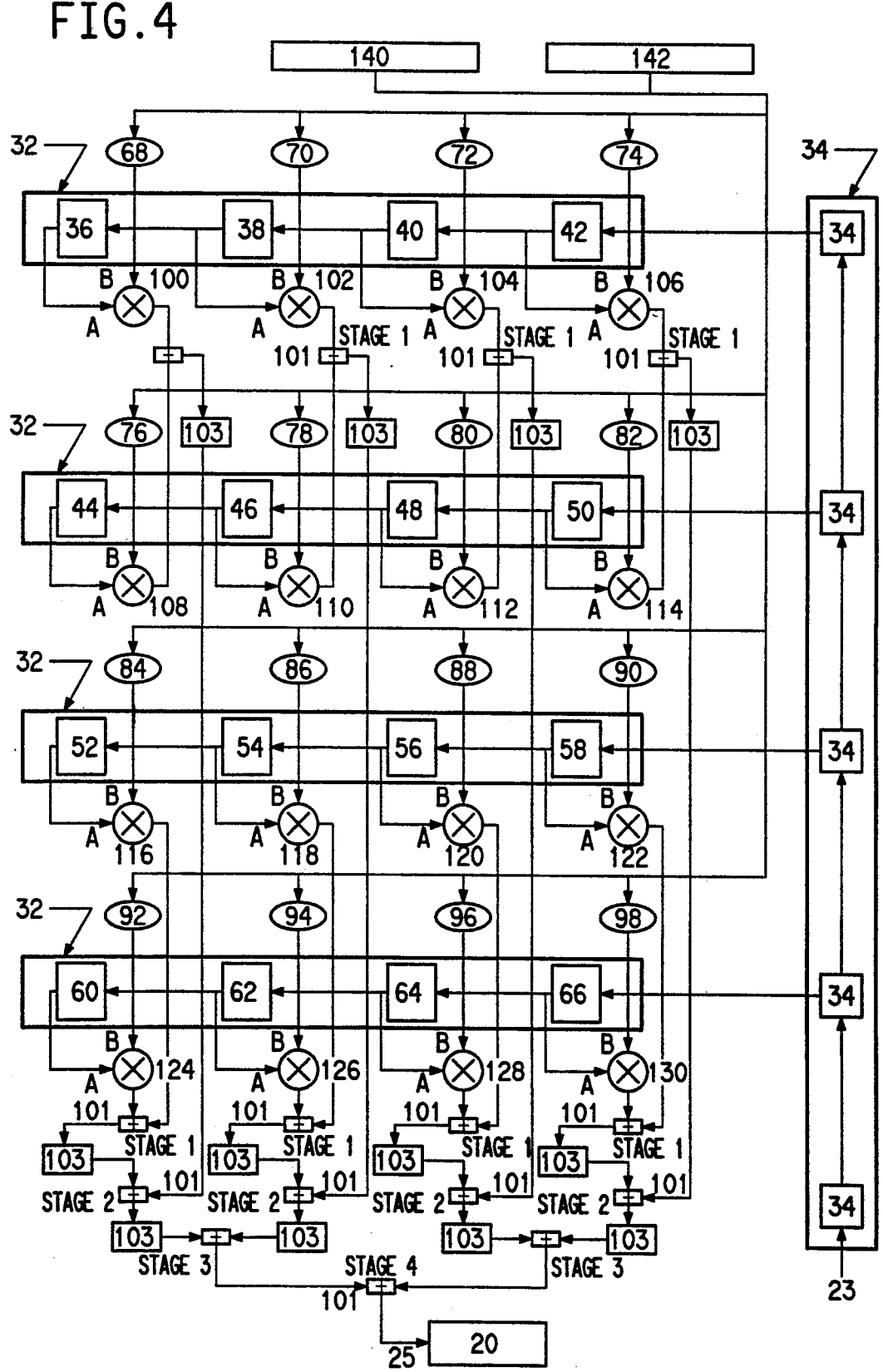
FIG. 4 is a detailed representation of the interpolator portion of the circuit represented as a black box in FIG. 3.

Reference is now made to FIG. 4, where the interpolator 16 is shown in detail. A raster line buffer 30 comprises a number of individual line buffer memories 34. In the preferred embodiment, if in the interpolation calculation a neighborhood of $N \times N$ original pixels is used, $N+1$ individual line buffers 34 are used. Pixel information from the stored image data 12 is directed over line 23 to the raster line buffer 30. The data are serially loaded into the individual line buffers 34, one raster line in each line buffer. Once at least N line buffers are loaded the primary clock begins advancing individual pixel data simultaneously from each of N line buffer 34 to each of the corresponding pipelines 32. Each pipeline comprises N data holding cells, and there are N pipelines. In the circuit depicted in FIG. 4, a $4 \times 4$ pixel neighborhood is used, so there are four pipelines 32 each containing 4 cells for a total of 16 cells, numbered 36, 38, 40, 42, 44, 46, 48, 50, 52, 54, 56, 58, 60, 62, 64 and 66. Within each pipeline 32, the four cells are connected so that each cell can receive data from the cell preceding it and supply data to the cell following it, the data transfer path going from right to left. The first cell in each pipeline receives data from a corresponding individual line buffer 34. When the calculation of all pixels based on the data loaded in line buffer 34A, 34B, 34C, and 34D, the pipeline inputs are shifted to receive data from line buffers 34B, 34C, 34D and 34E, the latter having been filled while disconected from the pipelines. Line buffer 34A now becomes available to be filled for subsequent use. The process is continually repeated rotating all five line buffers through all four pipelines.

Associated with each cell there is a multiplier 100 having two inputs, A and B. There are sixteen such multipliers in the $4 \times 4$ case, $N \times N$ in the general case. The multipliers are connected so that the value stored in each cell, appears at input A of each multiplier.

Also associated with each pipeline 32 there is a memory module memory (which could be a RAM chip) in which the sets of coefficients $C_k$ are loaded. In the circuit depicted in FIG. 4, a coefficient memory module is shown associated with each holding cell, and there are 16 such coefficient memory modules, designated as 68, 70, 72, 74, 76, 78, 80, 82, 84, 86, 88, 90, 92, 94, 96, and 98. The output of each of the memory modules is presented to input B of each of the multipliers 100 respectively. A fractional x and fractional y address generator 140 and 142 respectively, controlled by the secondary clock, is associated with the memory modules. The output of the x and y address generators 140 and 142 is used to extract the proper coefficients from the memory modules which are applied to the data to generate the new pixels $N_{ij}$.

The output of each of multipliers 100 appears in the first stage of a multistage adder 101 connected such that the output of multipliers 100 and 108, 102 and 110, 104 and 112, 106 and 114, 116 and 124, 118 and 126, 120 and 128, and 122 and 130 are added together. The outputs of the first stage of the adder appear and are summed in parallel in the second stage of adder 101, the output of which appears and is added in the third stage of adder 101. While not essential for the practice of this invention, it is preferred that registers 103 be placed between stages in the adder 101 as well as in the nput and output of the multipliers 100, 102, 104, ... to 130. Some of the registers have been omitted in FIG. 4 to avoid undue cluttering of the drawing.

In FIG. 4 there is shown a particular interconnection of the various adder stages. The specific sequence shown is not critical and may be altered, provided that the final output represents the output obtained by the implementation of equation (1) giving $N_k$. In selecting the order of addition of the results of the multiplication of the data, one must consider the coefficient magnitude for each pixel location in the neighborhood of pixel considered, and proceed with the addition order so as to avoid overflow or underflow in any of the adder stages.

In the preferred embodiment, a limiting circuit 151 may also be used to eliminate such over- or under-flow of the output of the final stage of adder 101 as follows. The information handled, i.e. pixel values, is in 8 bit format.

Generally speaking, to minimize rounding off error, the adder stages should be chosen with greater capacities than 8 bits. Typically 12 bit adder stages are used. If the significant bits of the adder output are 1-8 of the total available 0-11, 0 being the LSB (least significant bit) and 11 being the MSB (most significant bit), an underflow is indicated if the MSB is a "1". On the other hand if the MSB is a "0" and bit 9 is "1" an overflow is indicated. The limiting circuit replaces the adder output with a "0" for underflow and "255" for overflow.

The output of the final stage of adder 101 may be supplied together with its fractional address to an output buffer wherefrom it is retrieved for use as required, i.e. display, permanent storage, or further processing. In applications where the expanded data is used to drive a raster line output device in real or quasi-real time, it may be convenient to direct the output of the final register to a FIFO buffer memory element, wherefrom it is retrieved sequentially, in a first in first out order to drive the output device without need for specific pixel address information storage. In this case, and as described below in further detail, the fractional address generators are operated so that the y address generator is incremented at the end of each line until it reaches a count of "M" lines, and then resets, while the x address generator is incremented with every secondary clock pulse and reset after a count of "M". As a result, new pixels N1 and N2 (FIG. 2) are generated in a first pass on the data until all new pixels in one raster line have been calculated, and N3 and N4 are calculated in a second pass over the same data after the y address generator has been incremented, until a new raster line has been completed, producing the same final result as if all four pixel values were generated in one pass and their addresses stored or mapped in a buffer memory.

For ease of understanding the operation of the interpolator 16, in FIG. 4 elements driven by the primary clock are shown shaded, while elements driven by the secondary clock are shown white.

In operation, image (raster) lines are loaded into the raster line buffers 34. When N line buffers are full, the primary clock loads N pixels (one from each of the N line buffers) into the first stage of the parallel pipelines 32, cells 36, 44, 52, and 60 in the present embodiment. When N primary clock cycles have occurred, N×N pixels have been loaded and the pipelines are full. The outputs of all N stages of the pipelines are simultaneously available on the A inputs of the N×N multipliers 100, 102, 104, ... 130.

Each coefficient memory module 68, 70, 74, ... 98, has been pre-loaded with M squared coefficient values, where M is the enlargement ratio of output image to input image. In the example used earlier, in calculating $N_1$, $N_2$, $N_3$ and $N_4$, for D22, and where M=2, cells 36, 38, 40, ... 66 are respectively loaded with D11 in cell 36, D21 in cell 38 and so on through D44 in cell 66. At the same time memory modules 68, 70, 72, ..., 98, are preloaded with $C_k$ coefficient so that memory module 68 contains coefficients $C1_{11}$, $C2_{11}$, $C3_{11}$, and $C4_{11}$, memory module 70 contains $C1_{21}$, $C2_{21}$, $C3_{21}$ and $C4_{21}$ and so on through memory module 98 which contains coefficients $C1_{44}$, $C2_{44}$, $C3_{44}$ and $C4_{44}$.

The secondary clock drives the two counters 140 and 142, which generate offsets in fractional X and fractional Y pixel space, indexing all N×N coefficient memory modules simultaneously. On the first pass, the fractional Y index is zero. The fractional X index increments with each secondary clock cycle. The coefficients subsets are available on the B inputs of the multipliers. With each secondary clock, N×N multiplications of coefficients and image data (A×B) are simultaneously executed.

These N×N products are fed to the multi-stage adder 101, where from after several more secondary clock ticks, the resulting output pixel is available. Thereafter, with each secondary clock tick, a new output pixel is available. After M secondary clock cycles, all of the output pixels corresponding to fractional X indexing have been multiplied, and the primary clock loads the next set of N pixels from the raster line buffers.

After P primary clock cycles (where P is the number of pixels on an input raster line), the end of the first output line has been multiplied and first pass is complete. The second output image line is calculated by incrementing the fractional Y index and making a second pass over the same N input raster lines. After M passes over the input data, M output lines have been generated and the controller rotates the input raster line buffers. The "top" raster line is rotated out (and is available to be filled) and a new raster line is brought in from the "bottom". The complete output image is generated after M passes over each possible set of N adjacent raster lines. Using current technology, a minimum time of approximately 50 ns per output pixel (20 Megapixels/second) could be achieved.

Those having the benefit of the teachings of my invention as set forth above may attempt various modifications and applications not expressly set forth herein; thus, for example, the same principles and methods taught hereinabove may be equally advantageously applied without using two passes to process the raster lines and develop fractional Y data, and still remain within the scope of our invention. The coefficient source 18 may be omitted and the coefficients simply be pre-loaded in the coefficient memory modules. The preloaded coefficients may be for one interpolation method and magnification ratio only or preferably may comprise a look-up-table from which appropriate coefficients may be selected for use, corresponding to predetermined interpolation methods and/or magnification ratios. The invention is not limited to the specific embodiments and hardware described above, but rather is defined by the appended claims and their fair equivalents.

We claim:

1. An apparatus for calculating new pixel values by interpolation from original pixel values for images comprised of a plurality of pixels serially arrayed along a plurality of parallel lines, comprising:

primary timing signal means for generating an input timing signal having an input frequency;

output timing signal means for generating an output timing signal having an output frequency which is an integral multiple of the input frequency;

a plurality of parallel connected signal pipelines, each having a plurality of serially connected cells for receiving, holding, and transmitting, on command from the primary timing signal, an electrical signal indicative of a pixel value;

means associated with the pipelines, for serially supplying each of said pipelines in parallel with original pixel values from each of the parallel image lines and for moving all said supplied original pixel values simultaneously from cell to cell along each pipeline at a time interval controlled by the primary timing means;

calculating means associated with each of the cells including:

(1) selecting means controlled by said output timing signal means, for selecting, during a time interval controlled by the primary timing means, a number of subsets of coefficients;

(2) multiplying means for multiplying each time the original pixel values in the pipelines by one of said selected coefficient subsets; and (3) summing means for summing the output of said multiplying means for providing new pixel values.

2. An apparatus in accordance with claim 1, further including receiving means associated with said summing means, to receive said new pixel values.

3. An apparatus in accordance with claim 1 wherein the means to serially supply each of the pipelines with original pixel values includes raster line buffer means.

4. An apparatus in accordance with claim 3 wherein there is a plurality of raster line buffer means, the number of the raster line buffer means exceeding the number of the pipelines.

5. An apparatus in accordance with claim 1 further including fractional address generating means controlled by the secondary clock.

6. An apparatus in accordance with claim 5 wherein the fractional address generating means control the coefficient selecting means.

7. An apparatus in accordance with claim 1 or 6 further including coefficient calculating means controlled by the secondary clock and wherein the selected number of subsets of coefficients is selected from an adaptive set of coefficients calculated in said coefficient selecting means.

8. An apparatus in accordance with claim 1 wherein there is associated with the coefficient selecting means a look-up-table of precalculated coefficient values from which the subsets of coefficients are selected.

9. A method for calculating new pixel values by interpolation from original pixel values for images comprised of a plurality of pixels serially arrayed along a plurality of parallel lines, comprising the steps of:

generating a primary timing signal having a first frequency;

generating a secondary timing signal having a second frequency which is an integral multiple of the first frequency;

serially supplying original pixel values from each of the parallel image lines simultaneously to a plurality of parallel connected signal pipelines, each having a plurality of serially connected cells for receiving, holding, and transmitting, on command from the primary timing signal, an electrical signal indicative of a pixel value;

moving all said supplied original pixel values simultaneously from cell to cell along each pipeline at a time interval controlled by the primary timing means; and calculating new pixel values by:

(1) selecting at a rate controlled by said second timing signal during a time interval controlled by said first timing means, a number of subsets of coefficients;

(2) multiplying each time the original pixel values in the pipelines by one of said selected coefficient subsets; and (3) summing the output of said multiplying means.

10. A method in accordance with claim 9, further including the step of receiving and storing said new pixel values.

11. A method in accordance with claim 9, further including the step of receiving and displaying said new pixel values.

12. A method in accordance with claim 9 wherein the original pixels are serially supplied to each of the pipelines through raster line buffer means.

13. An apparatus in accordance with claim 12 wherein the number of said raster line buffer means exceeds the number of said pipelines.

14. A method in accordance with claim 9 further including the step of generating fractional addresses for the new pixel values.

15. A method in accordance with claim 9 further including the step of generating fractional addresses for the new pixel values using said secondary clock.

16. A method in accordance with claim 14 wherein the fractional addresses are used to select the coefficient sets and subsets.

17. A method in accordance with claim 9 further including the step of calculating an adaptive set of coefficients at a rate controlled by the secondary clock and selecting said number of subsets of coefficients from said calculated adaptive coefficient set.

18. A method in accordance with claim 9 wherein the step of selecting said subset of coefficients comprises selecting said subset from a look-up-table of precalculated coefficient values.

* * * * *